US007254563B1

(12) United States Patent
Gelfer

(10) Patent No.: US 7,254,563 B1
(45) Date of Patent: Aug. 7, 2007

(54) METHOD AND ARRANGEMENT FOR AUTOMATICALLY ORDERING SUPPLIES WHICH ARE CONSUMED DURING USAGE OF A DEVICE

(75) Inventor: George G. Gelfer, Glen Ellyn, IL (US)

(73) Assignee: Francotyp-Postalia AG & Co. (DE)

( * ) Notice: Subject to any disclaimer, the term of this patent is extended or adjusted under 35 U.S.C. 154(b) by 0 days.

(21) Appl. No.: 09/481,477

(22) Filed: Jan. 11, 2000

(51) Int. Cl.
*G06F 17/00* (2006.01)

(52) U.S. Cl. ............................ 705/401; 705/1; 705/26

(58) Field of Classification Search .................... 705/1, 705/400, 26, 401
See application file for complete search history.

(56) References Cited

U.S. PATENT DOCUMENTS

| | | | | |
|---|---|---|---|---|
| 4,441,197 | A | 4/1984 | Baun et al. | |
| 4,812,965 | A | 3/1989 | Taylor | |
| 4,812,992 | A | 3/1989 | Storace et al. | |
| 4,831,554 | A | 5/1989 | Storace et al. | |
| 5,193,065 | A | 3/1993 | Guerindom et al. | |
| 5,305,199 | A | 4/1994 | LoBiondo et al. | |
| 5,414,494 | A | 5/1995 | Aikens et al. | |
| 5,821,975 | A | 10/1998 | Günther et al. | |
| 5,949,467 | A | 9/1999 | Günther et al. | |
| 5,970,475 | A * | 10/1999 | Barnes et al. | 705/27 |

FOREIGN PATENT DOCUMENTS

| | | |
|---|---|---|
| EP | 0 825 567 | 2/1998 |
| EP | 0 878 305 | 11/1998 |
| FR | 2 793 443 | 11/2000 |
| JP | 02032665 A * | 2/1990 |

OTHER PUBLICATIONS

Canon Multipass C5500, 1999, Canon Computer Systems, Inc.*
English Tranlationof Sato Japan Patent JP 02032665 A.*

* cited by examiner

*Primary Examiner*—Naresh Vig
(74) *Attorney, Agent, or Firm*—Schiff Hardin LLP

(57) ABSTRACT

In a method for automatic ordering of supply items for a device which are consumed during usage of the device and an arrangement for the implementation of the method, a predetermined consumption quantity for a supply item is monitored and is evaluated relative to threshold of the consumption quantity which occurs earlier than complete depletion of the supply item, a communication connection between the device and a remote data center is established and automatic generation and communication of an ordering message takes place, the ordering message including an identification code, identification of the ordering entity is made on the basis of the identification code, and the order of the supply item belonging to the device is determined and filled.

39 Claims, 3 Drawing Sheets

METHOD AND ARRANGEMENT FOR AUTOMATICALLY ORDERING SUPPLIES WHICH ARE CONSUMED DURING USAGE OF A DEVICE

BACKGROUND OF THE INVENTION

1. Field of the Invention

The present invention is directed to a method for automatically ordering supplies for an apparatus in which the supplies are consumed during usage of the apparatus, as well as to an arrangement for the implementation of the method, particularly a method and arrangement which are employable for supplies of postage meter machines. The method and arrangement are applicable to ink cartridges for ink jet printing units, thermal transfer inking ribbon cassettes, self-adhesive franking tapes or other supplies.

2. Description of the Prior Art

Postage meter machines have been known since the 1920's and are still being constantly improved. The printing principle has changed from originally purely mechanical versions having a printing drum to electronic versions having a thermal transfer head or an ink jet printing head. Beginning in the 1970's, microprocessors and electronic credit memories have been utilized in the increasingly electronic controls. Moreover, specific security measures have been developed which are intended to prevent or detect an unauthorized tampering that is harmful to the manufacturer or the user or the mail carrier. The postage meter machine also consumes printing ink and the parts participating in the printing are subject to wear, and it is in the interest of the user and of the mail carrier that qualitatively high-grade material of the manufacturer be used. When, however, pirate products are utilized, this influences the service life and the printing quality of the machine. Pirate products usually are offered at a lower price because they are usually of a lesser quality than authorized products, and may be easier to acquire than the original materials via a dealer.

The dealers of postage meter machines are often responsible for deliveries to the customers and the customer believes the manufacturer is at fault if the deliveries do not arrive on time or are too expensive. The customer/user often does not plan delivery requirements properly enough in advance and the risk of downtime of the customers mail processing may arise due to lack of supplies, such as ink. Consequently, urgent requests for assistance to the manufacturer for supplies result, which must be partly delivered by courier. This could be alleviated by a direct distribution of the supplies to the customer, assuming an order placed in time.

It is known to display an impending change of a consumable supply item via a display. German OS 195 49 376 discloses utilizing sensors for determining the remaining quantity of inking ribbon in inking ribbon cassettes for a thermal transfer printer, or to count the number of imprints with the controller of the thermal transfer printer. Counting the imprints produced by a piezo ink jet printing head, however, cannot supply any information about the remaining amount of ink in the ink tank reservoir because, given a low through medium number of frankings per day, consumption due to priming predominates, thereby reducing the number of possible imprints per ink tank filling. In piezo ink jet printing heads, unfortunately, a large part of the ink is lost during priming and cannot be re-supplied to the head. It is therefore important for reliable ink supply that the depletion of ink in the reservoir be recognized and signaled in time.

Making an order for ink re-supply, however, continues to be the responsibility of the customer.

SUMMARY OF THE INVENTION

An object of the present invention is to provide a method for automatic ordering of supplies in devices that largely minimizes the employment of unauthorized supplies and that is economic and uncomplicated for the customer. An advance signaling of the approaching need for a re-supply should ensue for different supplies. An arrangement for the implementation of the method should include an automatic triggering of an order to the applicable manufacturer for supplies from that manufacturer.

This object is inventively achieved in a method and arrangement wherein monitoring and evaluation of a predetermined consumption quantity are undertaken, and the approach of an end of use of a supply item is recognized before the actual time of replacement or replenishment occurs. Dependent on the supply item, the consumption quantity can be a time, physical, monetary or accounting quantity or an item count. A combination of different use quantities can be taken into consideration in the evaluation for a more exact evaluation in order to trigger an ordering routine. For indirect recognition of an approach of the end of use, for example before the replacement of a cassette (ink tank/inking ribbon) of a postage meter machine, an evaluation of a predetermined counter reading for the imprints ensues before or after sensors acquire a low ink level/remaining value. After setting up a communication connection between the postage meter machine and a remote data center and after an automatic generation and communication of a ordering message, which includes an identification code, a triggering of the order of the supply item ensues after an identification of the ordering entity on the basis of the identification code. After this identification, a search in a data bank ensues, a corresponding supply being assigned in this data bank to each ordering entity. This simple ordering routine only allows one order for a predetermined supply item, however, the need for a scanner for sampling the supply item in the device is eliminated, since the type of supply item does not change.

Another embodiment of the inventive method and arrangement employs an ordering routine that allows the ordering of different supplies in greater numbers as well as requiring a communication of an order number corresponding to the various supplies in addition to the communication of the identification code. A search in a data bank for an allocated supplies can thereby be eliminated. The order number can have multiple parts or fields and can include an ordering code and/or an identification number for the supply item or items. It is assumed that an aggregation of the supplies with a generated ordering code and/or an identification number ensues at the manufacturer, by both or the latter being attached to a supply item available for sale, or being permanently physically allocated to the supply item. This may include, for example, marking the supply item with this order code and/or with the identification number, which can ensue in very different ways dependent on the physical state of the supply item. The device can include a chip card write/read unit for semi-automatic input or a scanner for automatic input of the order code and/or of the identification number. After a threshold for a consumption quantity is reached before the change of a supply item and after setting up a communication connection to the remote data center, an automatic generation and transmission of an encrypted ordering message ensues in the device. If only one user is allocated to the device, then the serial number of the device serves as the identification code.

In above examples, the ordering message includes the serial number of the device, the order code for the supply item and an identification number. The latter is a number identifying the type of supply item and a number identifying the ordered amount of the item, and possibly a checksum. After identifying the ordering entity on the basis of the identification code (serial number of the device), a determination of the appertaining supply item ensues on the basis of the ordering message, as does a triggering of the order in a shipping department. In the simplest case, an authenticity of the order can be checked in the data center by a comparison, when there is coincidence of the ordering code with a reference ordering code that is allocated to the serial number of the device in the data bank, and thus also indirectly allocated to the ordering entity. A further ordering routine that allows the same supply item to be ordered in greater number likewise requires a communication of an order number in additional to the communication of an identification code. This order number contains a number for the amount or number the supply item being ordered. The serial number of the device can again be employed as the identification code. A search in a data bank for a supply item allocated to the serial number of the device can thereby provide the nature of the supply item.

The device, for example a postage meter machine, contains a microprocessor and is equipped with equipment for monitoring the supply item in order to recognize a change of a supply item, and the microprocessor or micro-computer, following the change, executes an indirect or direct measuring routine that is adapted to the nature of the supply item and generates the consumption quantity. The device is thus inventively equipped with components that supply a consumption quantity, and telecommunication components for setting up a communication connection to the remote data center. The telecommunication components serve at least for communicating the ordering message and, optionally, a notification of the device, with the result of a check of the authenticity of the order being implemented externally from the device in the data center and being communicated back to the device. The microprocessor of the device is programmed:

- to recognize the approach of a need for change of a supply item,
- to display a message after the aforementioned recognition and to generate an ordering message, and
- to set up a communication connection to a remote data center, to communicate the ordering message.

As noted above, the communication connection may also serve the purpose of notifying the device after review of the authenticity of the order. It is possible to modify the operation of the device when the check that has been carried out has yielded a non-authenticity of the order.

DESCRIPTION OF THE PREFERRED EMBODIMENTS

Figure 1:
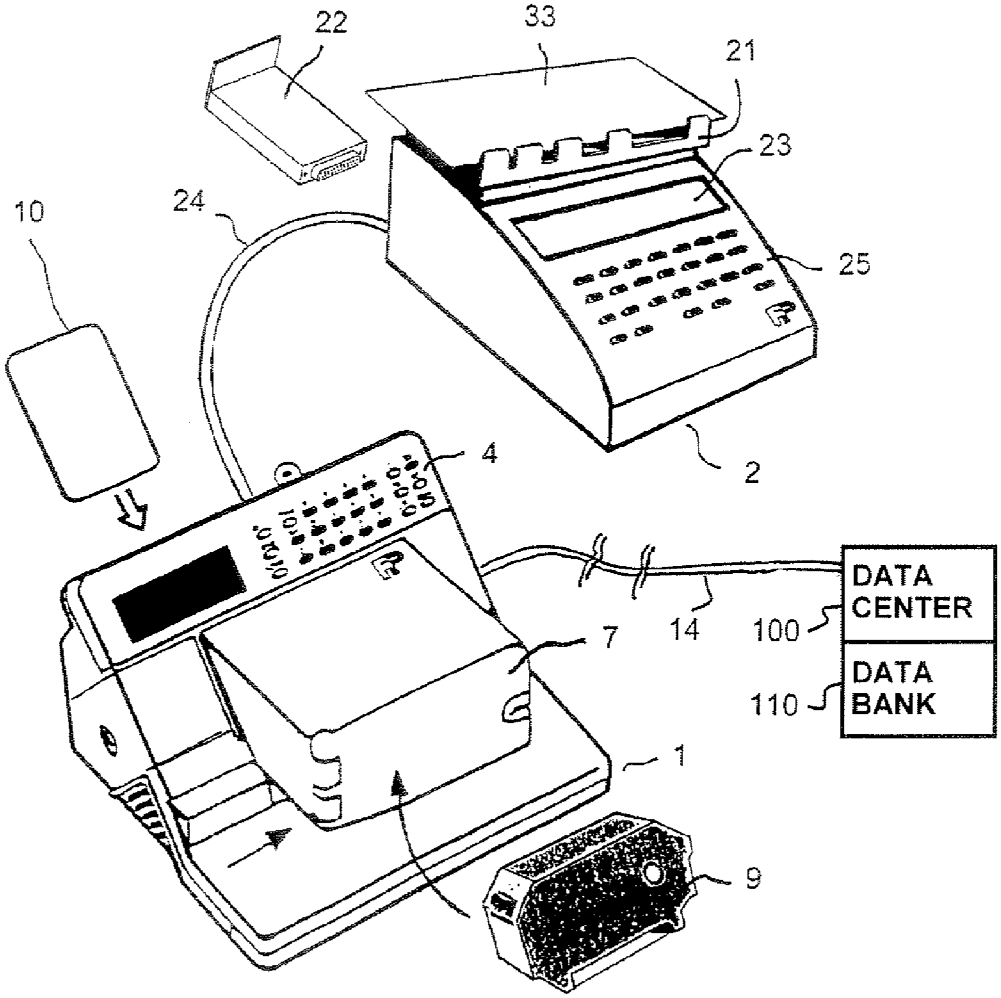
FIG. 1 is a perspective view of a first embodiment of a postage meter machine constructed and operating in accordance with the invention, seen from the left front.

A perspective view of a postage meter machine 1 of the type T1000 manufactured by Francotyp-Postalia AG & Co., and modified in accordance with the invention, is shown from the left front according to FIG. 1. The postage meter machine 1 has an internal modem and, for example for recrediting, is connectable via a first data connection 14 to a data center 100 that has a data bank 130. A chip card 10, for example, serves the purpose of setting the postage meter machine to a cost center under which the accounting is to be undertaken. The postage meter machine 1 has a cassette compartment 7 that must be opened for an introduction of a thermal transfer inking ribbon cassette 9. When opening before and/or during removal of the cassette, which a sensor (not shown) detects, the internal microprocessor generates a display text and a warning against the removal of a cassette 9 supplied by the manufacturer appears on the display of a user interface 4 which also warns against continued operation of the postage meter machine 1 with a different cassette because the removed cassette 9 cannot be re-employed. A marking in the form of a bar code is impressed on the inking ribbon at its beginning. After insertion of the new inking ribbon cassette into the postage meter machine, detection of this marking is automatically implemented with an optical scanner (not shown) in order to communicate the data content of the marking to the control unit of the postage meter machine 1, as is known from European Application 730 974. Differing from European Application 730 974, however, a communication between the control unit of the postage meter machine 1 and the data center 100 is implemented, and if an inking ribbon supplied by the manufacturer is recognized as a result, the microprocessor initiates display of an "okay" message, and an error message (call service) is displayed when the data center was incapable of recognizing an inking ribbon supplied by the manufacture. Simple, physical identifications can be used, for instance gluing on a bar code label that can be read with a simple scanner. The marking of the supply item (in this case the cassette 9 or the ribbon therein) with this order number can, of course, ensue in some other way with physical or chemical measures. Of course, the scanner is adapted in conformity with the aforementioned measures in order to read the marking.

In a first version, an order ensues after a comparison of a consumption quantity relative to a threshold. The microprocessor executes indirect or direct measuring routine that is adapted to the nature of the supply item and that generates the consumption quantity. The threshold can be pre-programmed by the manufacturer, can be entered by keyboard or can be loaded by chip card or by modem from the remote data center 100.

In a second version, generation of a message to the customer and a user input that is interpreted as acknowledgment that an order is to be triggered, ensue first. The order is triggered after a message is generated and communicated to the data center 100. The message can be encrypted in order to preclude an unauthorized order. A customer can also be given the possibility to modify the amount of the supply item to be ordered by using the user interface 4. The amount of the supply item to be ordered can be modified to zero, or at least one key can be actuated in order to suppress the automatic ordering. The order number and the serial number of the device, i.e. of the security module (PSD) of the meter or of the postage meter machine 1, are components of the message. The PSD (postal security device) is a component of modern postage meter machines and serves the purpose of debiting or accounting the franked mail and conducting such security-related routines as recrediting, and is therefore referred to below as a security module. Each of the inquiring devices uses an automatic routine that preferably utilizes the serial number of the device as the identification code. Given a postage meter machine 1, this allows the determination of its location and thus supplies the delivery address for shipping the order. A service routine for responding to a customer order is installed in the data center 100. This routine, based on an identification of the ordering entity or of the inquiring user and on an interpretation of the order number in the data center 100, checks the authenticity of the order. The serial number of the device is allocated to an ordering entity in the data bank 110 of the data center 100.

The order numbers for various supply items are listed in a list that is stored in non-volatile fashion in a memory of the device 1. This list can likewise be loaded with a chip card 10 or by modem from the remote data center 100. The use of such a list represents a considerable logistic advantage by allowing various supply items—independently of their type—to be ordered with the same method and without service personnel being required.

The order number can be multi-part. A first part or field is composed of an ordering code that is assigned only to a specific group of supply items that can be reordered for the particular device 1 and that also enables a documentation that the order had been automatically triggered by the device itself without entry by a person. An identification number forms a second part and identifies the type of supply item. An optional, third part can contain the item amount and an optional, fourth part can contain a checksum for checking the order for errors. The ordering number together with further data forms the aforementioned message. The manufacturer of the supply item generates an order code belonging to a specific group of supply items and generates an identification number for the type of supply item. It is assumed, for example, that an ordering code is incorrect for an ink tank cassette if the serial number belongs to a device with a thermal-transfer printing unit because the ink tank cassette, of course, does not belong to the group of supply items for thermal transfer printers. The allocation of the ordering code to a specific group of supply items is stored in a data bank in the form of a data set together with a reference ordering code and together with the serial number of the device. This ordering code has a predetermined relationship to the reference ordering code.

An identification number forms a second part of the order number and identifies the type of supply item. The authenticity can be checked on the basis of the ordering code in the data center 100. This does not preclude the authenticity being determined on the basis of other data in other versions. At least a part of the ordering message can be communicated encrypted and can be utilized for the authenticity check. The advantage of checking in the data center 100 is that, of course, no manipulation can be undertaken there.

Figure 2:
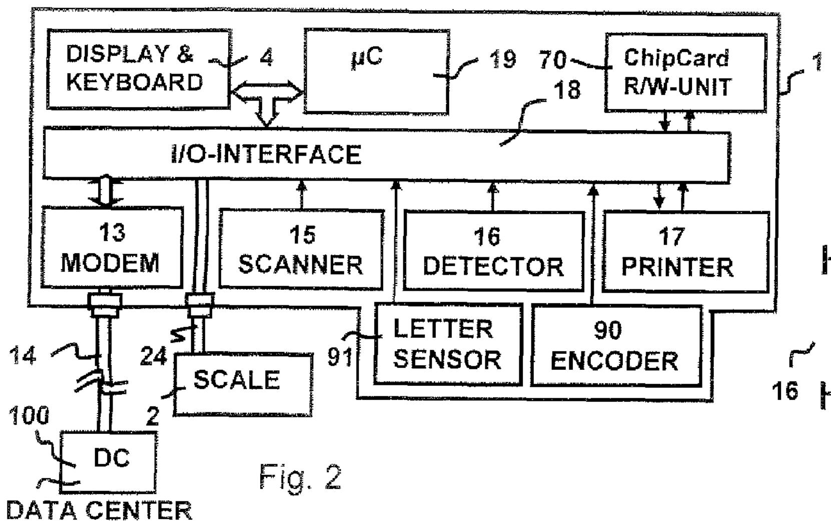
FIG. 2 is a block circuit diagram of the postage meter machine according to FIG. 1.

A block circuit diagram that applies to the postage meter machine 1 (shown in FIG. 1) or to some other arbitrary device is explained on the basis of FIG. 2. Such a device has a microcomputer (μC) 19 for controlling the user interface 4 formed by a keyboard and a display with a controller, and for controlling a modem 13 and a printer 17 and/or other actuators that are not shown and that are connected to the microcomputer 19 via an input/output interface 18. Inventively, a scanner 15 is connected to the input/output interface 18 or a comparable means for entry of at least parts of ordering numbers for supply items is connected thereto. Further sensors such as an encoder 90 and a letter sensor 91 are connected in a known way. For reliable detection of the removal or replacement of the supply item, at least one detector 16 is connected to the input/output interface 18. In conjunction with a specific measuring method for a consumption quantity, a determination can be made with the components 90, 91 and/or 16 by the microcomputer 19 as to whether the determination of the use can be continued or ended or can begin anew.

The detector 16 allows the presence of a supply item to be directly or indirectly identified according to a physical interaction principle, if the supply item is a solid body. For example, the supply item is an inking ribbon for the postage meter machine 1 according to FIG. 1. A data connection 14 connects the modem 13 to the data center 100. The scanner 15 can be omitted when the ordering number is entered by user interface 4 and is communicated to the data center 100 via the modem 13 and the data connection 14.

A postage calculating scale 2 can be connected to the input/output interface 18 of the postage meter machine 1 via a cable 24 for data connection. The postage calculating scale 2 has a weighing pan 21, a display 23 and a keyboard 25 for entering shipping information about a letter 33 to be dispatched. When the data connection 24 between the devices of a system is present, one device, for example, the postage calculating scale 2 of a franking system, cannot only send the postage value and other data to the postage meter machine 1 but also can send a message to the remote data center 100 via the modem of the postage meter machine 1, this being employed, for example, as rate PROM for calculating the postage value. The latter is located within a memory insert card 22 that can be plugged into the postage calculating scale 2. The data center 100 can distinguish on the basis of data stored in a data bank 110, whether an authorized or an unauthorized postage fee schedule table is being employed.

Fundamentally, the inventive solution can be applied to postage meter machines of other types. In another postage type of meter machine (not shown), for example, the supply item can be an ink jet printing head with an integrated ink tank, for example a cartridge. Such a throw-away printing head is, for example, Siemens Type DHP50.

Figure 3:
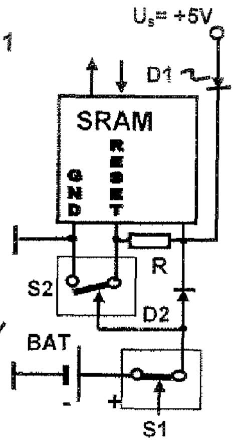
FIG. 3 is a circuit diagram of a detector for use in the inventive method and arrangement.

FIG. 3 shows a circuit diagram of a detector 16 that reliably detects the removal or replacement of the supply item even when the device is turned off and is not supplied with the system voltage $U_S$. The detector 16 has a commercially obtainable lithium battery BAT that supplies a memory SRAM with a memory maintenance voltage of approximately 3 V. A first switch S1 is actuated upon removal or replacement of the supply item. For example, a mechanical contact is opened, which interrupts the voltage supply to the memory SRAM by the lithium battery BAT. This voltage loss is detected and causes the closing of a second switch S2 that is preferably realized as a CMOS circuit. The reset input of the memory SRAM is thus connected to ground (L-level), which leads to the reliable erasure of the memory content of the memory SRAM. Otherwise, with the device turned on, a positive voltage $U_S$=+4.5 through +5V (H-level) is at the reset input via a resistor R and the diode D1, or a positive voltage $U_{BAT}$=+2.5 through +3V (H-level) is present via the diode D2 when the device is turned off. The memory SRAM can be fashioned as a static random access memory that is equipped with a code by the microcomputer 19 via the interface 18 with a shift register (not shown), and can be interrogated with respect to the presence of the code.

Figures 4, 5:
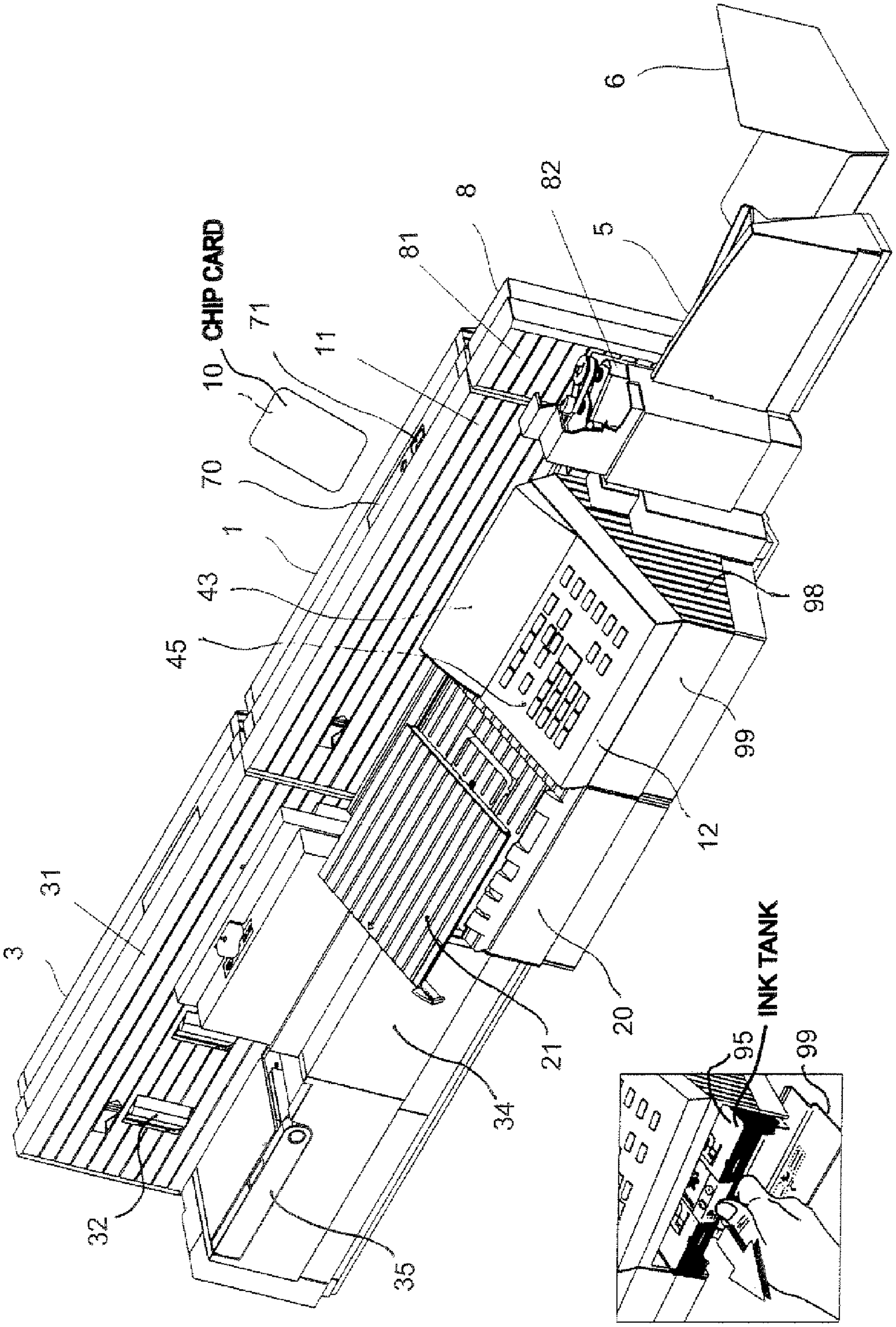
FIG. 4 is a perspective view of a second embodiment of postage meter machine constructed and operating in accordance with the invention, seen from the right front.
FIG. 5 illustrates the change of the ink tank in the postage meter machine of FIG. 4.

In the postage meter machine 1*a* according to FIG. 4 the supply item is an ink tank filled with ink. This embodiment likewise employs a modem and of a sensor that recognizes the approach of the replacement or the insertion of a new supply item. The postage meter machine 1 *a* has a sensor and a control unit with a processor that is programmed, after the recognition, to generate a message and to display it and may also interpret a user input made in conjunction with the order, this being communicated to the data center by modem as an encrypted ordering message.

It may be, for example, for some peripheral device that the supply item is in a non-solid aggregate state. It is provided for a periphery device that the supply item is a specific liquid for a letter moistener and sealer. This can be a component of an automatic delivery apparatus for letters. Usually, however, at least one container is present that is a solid body and can be provided with a marking. In another case, a chip is employed in which the code word is stored. By producing a connection, for example via electrical contacts or wirelessly, the code word can be read out by scanner upon installation of the new supply item.

FIG. 4 is a perspective view of a postage meter machine 1*a* of the JetMail® type, available from Francotyp-Postalia AG & Co. and modified in accordance with the invention, shown from the right. The machine 1*a* has an internal data connection to the integrated scale 20 whose rate PROM (not shown) can likewise be checked like, for example, any other arbitrary component that is present in modularly removable form and has a memory.

An automatic feeder 3 with an integrated separating means is arranged upstream of the postage meter machine 1*a*. A pressure bow 35 can be lifted upwardly on a hinge so as to press on a stack of mail from which the letters are separated with removal rollers 32. Further parts of the separating means are located under a hood 34. A letter lies against a guide plate 31 and is moved downstream to the guide plate 11 of the postage meter machine 1, where the printing procedure called "franking" ensues. A franked letter that is moved farther lies against a guide plate 81 of a sealing module 8. A sealing drum pair 82 seals any envelopes that are not yet completely closed and ejects them via a guide 5 into the deposit box 6. The structure of the postage meter machine 1*a* of the JetMail® type is disclosed in greater detail, for example in German Patent Application DE 199 00 686.5-26.

A chip card write/read unit 70 and an on/off switch 71 are arranged in the guide plate 11 of the postage meter machine 1*a*. After being turned on, a chip card 10 can be employed in conjunction with the user interface 43, 45 for a simplified setting of the postage meter machine. The user interface 43, 45 is located on the meter 12 of the postage meter machine 1*a*. An internationally employable user interface is disclosed in greater detail in German Utility Model 298 21 903.

A microprocessor (µP) 46 (shown in FIG. 6) of the postage meter machine 1*a* monitors the filling level of an ink tank 95 (shown in FIG. 5) with an ink depletion sensor 92. The sensor 92 can be in contact with two electrodes according to German Patent 196 13 944. Such a sensor in the JetMail® already emits a depletion signal—to provide a margin of safety—when a maximum of 200 frankings are still possible in order to avoid an incompletely printed franking print format due to lack of ink. As warranted, the microprocessor 46 generates a display text for display in the display 43: THE INK SUPPLY IS NEARLY USED. PLEASE REPLACE THE INK TANK AS SOON AS POSSIBLE! REMAINING IMPRINTS: 200.

The postage meter machine 1*a* can now continue to be operated with the residual ink quantity. In its memory, the microprocessor 46 has a backward counter that is preset to the number 200 by the depletion of ink signal and is deincremented by one with every further franking. The number 200 is selected from empirical values for a remaining number of imprints plus a safety margin. The number identifying the remainder can be displayed before the next franking. After every further franking, the microprocessor generates a status line that indicates the number of remaining printings and finally outputs the message: THE INK SUPPLY HAS BEEN USED. PLEASE REPLACE THE INK TANK.

Figure 6:
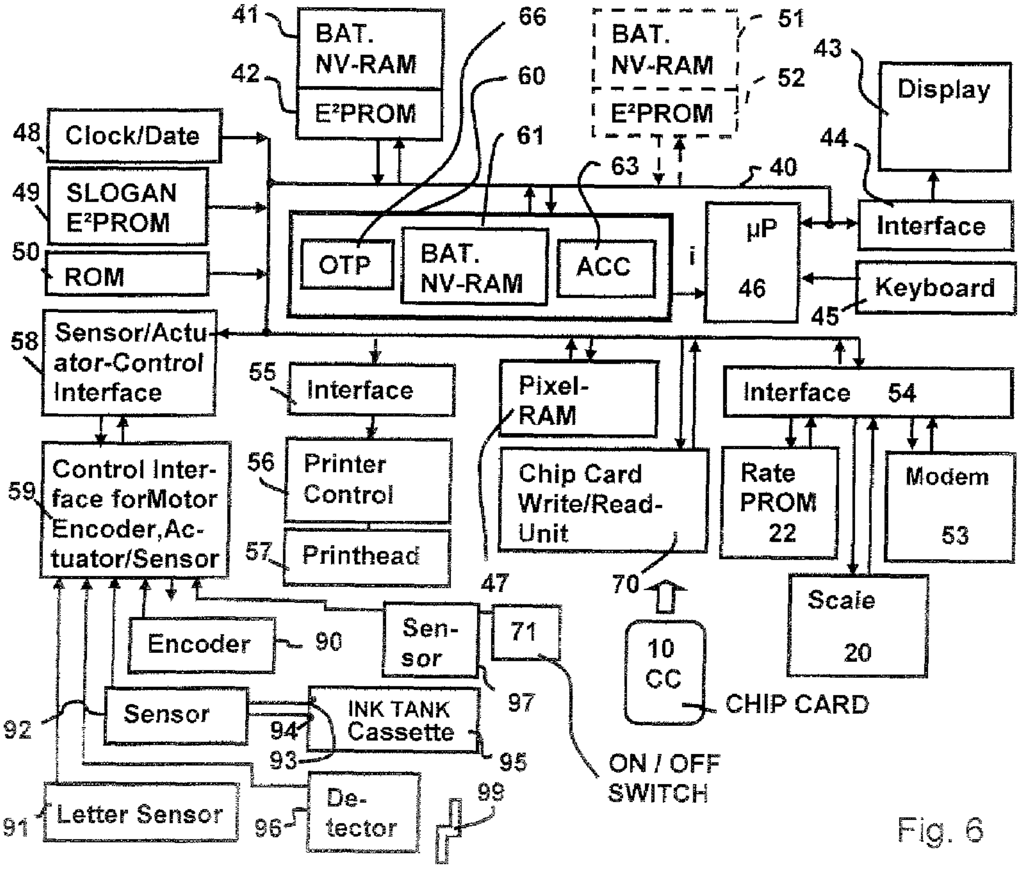
FIG. 6 is a block circuit diagram of the postage meter machine according to FIG. 4.

As shown in FIG. 6, after opening the flap 99 of the ink compartment 98, the used ink tank 95 can be removed and can be placed into a plastic bag that collects ink residues that may possibly leak out. A new ink tank 95 can be removed from its packaging and a check can be made to determine whether the color of the ink is correct. A perforation encoding at the back side of the ink tank can be utilized for this purpose. At the same time, the new code word can be read. The new ink tank 95 is introduced into lateral guide rails (not shown) of the ink tank compartment and is inserted until it noticeably engages. The microprocessor generates the message "THE INK TANK IS MISSING" as long as the ink tank 95 has not been correctly inserted.

A contact is automatically closed when insert or replacing the new supply item. As a result of this contact, the postage meter machine 1*a* recognizes that a new supply item has been installed. Dependent on a perforation encoding on the back side of the ink tank 95, the original ink type (red for mail, fluorescent red, etc.) can be detected with suitably fashioned contacts.

Upon reaching an ink level before the ink tank begins to operate with a reserve quantity of ink, or given a low ink level after a depletion signal has been emitted, i.e. when fewer than 200 frankings are possible, a user-selectable threshold is reached that triggers an automatic ordering of the supply item, an ink tank in this case. A connection to the data center 100 (FIG. 1) of the manufacturer is set up for that purpose.

All modern postage meter machines currently are already equipped with a modem in order to be able to communicate with the data center 100 of the manufacturer. This normally serves the purpose of getting a credit amount loaded from the data center 100 when the corresponding memories have been emptied due to franking. The transmission of the order message requires an additional communication routine. Data protection measures of the type known for remote loading of a postage meter machine are utilized in order to prevent the code words from being ascertained by tapping the transmission link. An encryption of the order message with a DES (data encryption standard) or with some other, known encryption algorithm that is also utilized for data protection in the remote loading of a postage meter machine with, for example, a credit is therefore advantageous.

The data center 100 receives the order message for the ink tank cassette 95 together with a serial number of the postage meter machine 1*a* or of its security module. A search is made for the matching code in the group of stored reference ordering codes. If a match is found, the order of the supply item is considered authentic.

FIG. 6 shows a block circuit diagram of the postage meter machine 1*a* of the JetMail® type having a processor 46 and a base including an integrated scale 20, a rate PROM 22, a modem 53 and a detector 96 that recognizes the replacement or the insertion of a new ink tank cassette 95. The rate PROM 22, alternatively, can be realized in the memory module 51, 52 (shown with broken lines) within the meter. Alternatively, the direct measurement with the detector 96 can be replaced by an indirect measuring method that utilizes the existing sensors 92 and 97. The microprocessor 46 is programmed such that the number of remaining imprints after every activation of the device and/or replacement of the supply item is displayed. After a consumption of ink, a predetermined remainder of ink is detected with the electrodes 93, 94 and with the sensor 92 and is communicated via a sensor/actuator control 59, and a sensor/actuator control interface 58 (which can be an ASIC) to the microprocessor 46, which subsequently generates a display. A predetermined remainder of ink that suffices for approximately 200 imprints remains when the conductivity between the contacts 93, 94 falls below a predetermined threshold. Switching the postage meter machine 1*a* on/off via the switch 71 can be detected via the sensor 97 that is likewise connected to the sensor/actuator control 59. A deactivation at the time when the postage meter machine 1*a* has only the remaining ink available to it can indicate an impending replacement. By comparing the counted imprints to a limit value or by counting down from a predetermined number, a number of remaining imprints before the complete depletion of ink can be identified, an automatic ordering routine then being triggered. The microprocessor 46 is programmed for interpreting a predetermined counter reading for the remaining imprints when sensors 97 and 92 acquire a reactivation and an ink level. The microprocessor 46, sensor 92 and electrodes 93, 94 at the ink tank cassette 95 are provided for recognizing the approach of a replacement of the ink tank cassette 95. On the basis of an identifier this supply item, the order number thereof can be generated, this being characteristic for a specific ink.

A security module 60 serves as a first accounting module and has a hardware accounting unit 63 and a battery-supported, non-volatile memory 61 in which a credit can be loaded by modem 53. An OTP (one-time programmable) processor 66 thereby carries out security routines both for recrediting as well as for securing the registered data with a MAC (message authentification code). The advantage of the security module 60 is that the check of the dependability and the approval of the inventive franking and posting machine, which is carried out by the mail carrier, is then only required for the appertaining security module 60 and the connected printer module 55–57. The chip card 10 in conjunction with the chip card write/read unit 70 forms a second processing module. The microprocessor 46 and the first memory components 41, 42 then form a third processing module, and the microprocessor 46 and the second memory components 51, 52 (shown with broken lines) then form a fourth processing module, etc. As a rule, one accounting module suffices, and the other processing modules can assume other tasks.

The microprocessor 46 with the appertaining memories 41, 42 is programmed for counting the imprints in conjunction with the recognition of an approach of the replacement of the ink tank cassette 95 and is also employed as a postage computer and for print control. The security module 60 serves for accounting and calculating encryption codes, at least for communication with the data center for the purpose of recrediting. On the basis of this division of tasks, the accounting module has been further-developed into the security module 60. All processing modules 41, 42 and 51, 52 of the security module 60, the microprocessor 46, the interface assemblies 44, 54 and 55, a main memory pixel RAM 47, clock/date module 48, slogan memory EEPROM 49, program memory ROM 50 and an ASIC with the sensor/actuator control interface 58 are connected to an internal bus 40 of the controller inside the meter 1*a*. An input to the ports of the microprocessor 46 for corresponding control of the postage meter machine 1 is actuated with the keyboard 45. A generated screen image can proceed to the display 43 via the interface assembly 44. The display has an integrated controller for support.

Further sensors and actuators of the base (which are not explained in greater detail here), an encoder 90 for the letter movement and at least one letter sensor 91 are electrically connected to the meter 12 of the postage meter machine 1 via the sensor/actuator control interface 58 and at least the modem 53 is electrically connected thereto via the interface 54. Both interface circuits 54 and 58 can also be realized in an application-specific integrated circuit ASIC. Further details with respect thereto are described in European Application 716 398. Regarding the control of the other components in the base and in the peripheral components further details can be derived from European Application 875 864.

The remote data center 100 is not shown in FIG. 6. The data center 100 can be remote from a telepostage data center TDC for recrediting but is communicatively connected to the latter. A further advantage of the method is the possibility of acquiring information about the usage of the customer.

The data center 100, after determining the order for the supply item, automatically generates an acknowledgment of this order and sends it to the device 1*a*. Given notification by modem, the microprocessor 46 thereof is programmed to generate a message and to display it via the display 43. The notification of the order can also ensue in a known way via postcard.

After determining the order of the supply item, the data center 100 automatically generales an invoice addressed to the ordering entity and sends it. alternatively, an agreement can already be made at the time of purchase that the data center 100, after determining the order of the supply item, will initiate an automatic debiting from the account of the ordering entity in conformity with the price of the ordered supply item.

It is advantageous that the routine for automatic ordering of supply items can be turned on or off. This can occur in that an interrogation routine that is called during initialization of the device, this turning the function for automatic ordering of use material on or off dependent on an input. The function for automatic ordering of supply items, alternatively, can be turned on or off by remote switching from the data center 100.

Although modifications and changes may be suggested by those skilled in the art, it is the intention of the inventor to embody within the patent warranted hereon all changes and modifications as reasonably and properly come within the scope of his contribution to the art.

I claim as my invention:

1. A method for automatically ordering a supply item which is consumed during operation of a device, comprising the steps of:

electronically monitoring, in a device, a consumption quantity associated with consumption of a supply item during operation of said device and repeatedly electronically comparing said consumption quantity to a threshold representing consumption of said supply item before complete depletion of said supply item;

upon said consumption quantity reaching said threshold, automatically electronically generating an ordering message at said device representing an order for a requested supply item, and including an identification code in said ordering message, and only thereafter establishing a communication between said device and a data center and communicating said ordering message from said device to said data center;

at said data center, electronically identifying, based on said identification code, an entity which has placed said ordering message;

at said data center, electronically compiling a data bank containing respective identification codes for a plurality of different ordering entities, each ordering entity having at least one permissible supply item associated therewith;

upon receipt of said ordering message at said data center, electronically conducting an ordering routine at said data center including searching said data bank to find the ordering entity associated with the identification code in the ordering message and filling said order only if said requested supply item conforms to said at least one permissible supply item, and otherwise not filling said order; and generating a confirmation message at said data center when said order is filled, and transmitting said confirmation message from said data center to said device.

2. A method as claimed in claim 1 comprising selecting said predetermined consumption quantity from the group consisting of a time quantity, a physical quantity, a monetary quantity and an accounting quantity, dependent on said supply item.

3. A method as claimed in claim 1 wherein said consumption quantity is an item count and wherein the step of monitoring said predetermined consumption quantity and repeatedly comparing said consumption quantity to a threshold comprises incrementing said item count as said supply item is consumed, and comparing said item count to a predetermined counter reading as said threshold.

4. A method as claimed in claim 3 wherein said device comprises a printing device and wherein said supply item comprises an inking ribbon cassette used during printing in said device, and wherein the step of incrementing said item count comprises incrementing said item count upon each imprint which is made on said inking ribbon cassette, and wherein said predetermined counter reading comprises a number of said imprints which is less than a total number of imprints accommodated by said inking ribbon cassette.

5. A method as claimed in claim 3 wherein said device is a printer device and wherein said supply item comprises ink contained in an ink tank cassette which is used during printing and wherein said item count comprises an amount of said ink from said ink tank which is consumed during each imprint produced by said printer device, and wherein said predetermined counter reading is an ink volume, represented by a plurality of said imprints, which is less than a total volume of ink in said ink tank cassette.

6. A method as claimed in claim 1 wherein said device is a printer device and wherein said supply item is ink contained in an ink tank cassette which is used for printing by said printer device, and wherein the step of monitoring said predetermined consumption quantity and repeatedly comparing said consumption quantity to a threshold comprised disposing electrodes in said ink tank cassette and monitoring a current between said electrodes to identify when said ink in said ink tank cassette falls below a predetermined level, said predetermined level comprising said threshold.

7. A method as claimed in claim 1 wherein the step of monitoring a predetermined consumption quantity and repeatedly comparing said predetermined consumption quantity to a threshold comprises monitoring a plurality of different consumption quantities associated with said supply item and repeatedly comparing each of said plurality of predetermined consumption quantities to respective thresholds which are respectively reached before complete depletion of said supply item.

8. A method as claimed in claim 1 comprising including an order number in said ordering message, and electronically triggering said ordering routine at said data center dependent on said ordering number.

9. A method as claimed in claim 8 comprising selecting said ordering number from the group consisting of order codes for respectively different supply items and identification numbers for respectively different supply items.

10. A method as claimed in claim 8 comprising physically attaching an indicator representing said ordering number to said supply item.

11. A method as claimed in claim 10 comprising selecting said indicator dependent on a physical state of said supply item.

12. A method as claimed in claim 8 wherein said order number includes an identification number for an amount of said supply item.

13. A method as claimed in claim 8 wherein said order number contains a serial number of said device.

14. A method as claimed in claim 8 wherein said ordering number includes a number identifying a type of said supply item.

15. A method as claimed in claim 8 wherein said ordering number includes a number identifying an ordered amount of said supply item.

16. A method as claimed in claim 8 comprising including a checksum in said ordering message.

17. A method as claimed in claim 1 comprising encrypting said ordering message.

18. A method as claimed in claim 1 comprising:

assigning a serial number to said device;

assigning respective, unique order numbers to different supply items;

allocating order numbers for respectively supply items, permissible for use by said device, to the serial number of said device and electronically storing the allocation at said data center;

including said serial number and said ordering number in said communication established from said device to said data center, and electronically encrypting said ordering message;

upon receipt of said ordering message at said data center, electronically decrypting said ordering message; and at said data center after decrypting said ordering message, electronically checking authenticity of said ordering message using said serial number and using at least a part of said ordering number before filling said order.

19. A method as claimed in claim 18 comprising selecting said ordering number from the group consisting of ordering codes respectively associated with different supply items and identification numbers respectively associated with different supply items.

20. A method as claimed in claim 1 comprising automatically generating an invoice addressed to said ordering entity at said data center upon filling said order, and transmitting said invoice to said ordering entity.

21. A method as claimed in claim 1 wherein said ordering entity maintains an account accessible by said data center, and comprising the additional step of automatically debiting said account at said data center dependent on a price of said supply item upon filling said order.

22. A method as claimed in claim 1 comprising automatically generating said ordering message and establishing said communication from said device to said data center in a routine for automatic ordering, and allowing a user of said device to selectively disenable said routine for automatic ordering.

23. A method as claimed in claim 22 comprising conducting an interrogation routine in said device upon initialization of said device and, within said interrogation routine, allowing for a user input into said device to selectively enable or disenable said routine for automatic ordering.

24. A method as claimed in claim 1 wherein generating said ordering message and establishing said communication from said device to said data center are conducted in a routine for automatic ordering, and allowing remote disenabling of said routine for automatic ordering by remote switching from said data center in a communication from said data center to said device.

25. An arrangement for ordering a supply item for a device, comprising:

a device which, during operation, consumes at least one supply item;

a monitor in said device for monitoring consumption of said supply item in said device and for generating a consumption quantity representing a degree of consumption of said supply item;

a control unit supplied with said consumption quantity which recognizes, dependent on said consumption quantity, a need to order said supply item before said supply item is completely consumed, and which generates an ordering message representing an order for said supply item and establishes a communication to a remote data center for transmitting said ordering message to order said supply item from said data center;

said control unit being adapted to receive a message from said remote data center indicating at said emote data center a check of authenticity of said ordering message has determined that said ordering message is not authentic and said control unit modifying operation of said device upon receipt of said message from said remote data center.

26. An arrangement as claimed in claim 25 wherein said means for monitoring consumption of said supply item generates a consumption quantity indicative of a degree of consumption of said supply item and dependent on a type of said supply item.

27. An arrangement as claimed in claim 26 wherein said control unit compares said consumption quantity to a threshold and generates said ordering message and establishes said communication if said threshold is exceeded.

28. An arrangement as claimed in claim 27 wherein said device comprises an input unit for entering said threshold into said control unit, said input unit being selected from the group consisting of a keyboard connected to said control unit, a chip card and chip card reader connected to said control unit, and a modem connected to said control unit and communicable with said remote data center.

29. An arrangement as claimed in claim 25 wherein said control unit encrypts said ordering message.

30. An arrangement as claimed in claim 29 further comprising a display connected to said control unit, and wherein said control unit displays a number of remaining imprints on said display each time said device is activated.

31. An arrangement as claimed in claim 29 further comprising a display connected to said control unit, and wherein said control unit displays a number of remaining imprints on said display each time said ink source is replaced.

32. An arrangement as claimed in claim 25 further comprising a display connected to said control unit and an input unit connected to said control unit, said control unit displaying said ordering message on said display before transmitting said ordering message to said remote data center, and said input unit allowing a user to modify said ordering message.

33. An arrangement as claimed in claim 32 wherein said keyboard allows suppression of said ordering message so that no ordering message is communicated to said remote data center.

34. An arrangement as claimed in claim 25 wherein said device is a printing device and comprises a printer which produces a plurality of imprints using an ink source as said supply item, said ink source having ink for producing a predetermined number of said imprints, and wherein said means for monitoring said supply item comprises a counter which counts a number of said imprints and which generates a count corresponding to said number of imprints and supplies said count to said control unit, and wherein said control unit generates said ordering message and establishes communication with said remote data center when said count reaches a value which is less than said total number of imprints.

35. An arrangement as claimed in claim 34 wherein said printer is a thermal printer and wherein said ink source is a thermal inking ribbon.

36. An arrangement as claimed in claim 34 wherein said printer is an ink jet printer and wherein said ink source is an ink tank cassette.

37. An arrangement as claimed in claim 34 wherein said printer is an ink jet printer and wherein said ink source is an ink tank cassette containing ink therein at an ink level which changes dependent on the number of imprints made by said ink jet printer, and wherein said means for monitoring consumption comprises a sensor which identifies said ink level and wherein said control unit calculates a number of remaining imprints when said ink level, as sensed by said sensor, reaches a predetermined level.

38. An arrangement as claimed in claim 37 wherein said sensor comprises electrodes which interact with said ink in said ink tank cassette which supply a signal to said control unit, and further comprising an input unit connected to said control unit allowing input of characteristic information about said ink, and wherein said control unit calculates said number of remaining imprints dependent on said signal from said electrodes and said characteristic information about said ink.

39. An arrangement as claimed in claim 25 wherein said device comprises a display connected to said control unit, and wherein said control unit displays a message on said display if said ordering message is determined to be non-authentic.

* * * * *

UNITED STATES PATENT AND TRADEMARK OFFICE

CERTIFICATE OF CORRECTION

PATENT NO. : 7,254,563 B1 
APPLICATION NO. : 09/481477
DATED : August 7, 2007
INVENTOR(S) : George G. Gelfer It is certified that error appears in the above-identified patent and that said Letters Patent is hereby corrected as shown below:

On the title page, add:

(30) Foreign Application Priority Data

January 11, 1999 (DE) ....................................19958949

Signed and Sealed this

Sixth Day of November, 2007

JON W. DUDAS
*Director of the United States Patent and Trademark Office*